(12) United States Patent
Ueda

(10) Patent No.: US 11,619,349 B2
(45) Date of Patent: Apr. 4, 2023

(54) HIGH-PRESSURE TANK AND METHOD FOR MANUFACTURING HIGH-PRESSURE TANK

(71) Applicant: TOYOTA JIDOSHA KABUSHIKI KAISHA, Toyota (JP)

(72) Inventor: Naoki Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/457,488

(22) Filed: Dec. 3, 2021

(65) Prior Publication Data
US 2022/0235904 A1 Jul. 28, 2022

(30) Foreign Application Priority Data

Jan. 26, 2021 (JP) .............................. JP2021-010390

(51) Int. Cl.
*F17C 1/16* (2006.01)

(52) U.S. Cl.
CPC ........ *F17C 1/16* (2013.01); *F17C 2201/0109* (2013.01); *F17C 2203/012* (2013.01); *F17C 2203/067* (2013.01); *F17C 2203/0621* (2013.01); *F17C 2203/0673* (2013.01); *F17C 2209/2163* (2013.01); *F17C 2209/232* (2013.01); *F17C 2221/012* (2013.01); *F17C 2270/0184* (2013.01)

(58) Field of Classification Search
CPC ................ F17C 1/16; F17C 2201/0109; F17C 2203/012; F17C 2203/0621; F17C 2203/067; F17C 2203/0673; F17C 2209/2163; F17C 2209/232; F17C 2221/012; F17C 2270/0184; F17C 1/10; F17C 1/02; F17C 1/04; F17C 1/06; F17C 2203/068; Y02E 60/32
USPC ......................................................... 220/590
See application file for complete search history.

(56) References Cited

U.S. PATENT DOCUMENTS

| | | | | |
|---|---|---|---|---|
| 4,588,622 A | * | 5/1986 | Sukarie | ................... F16J 12/00 220/62.19 |
| 2007/0205201 A1 | * | 9/2007 | Cundiff | ..................... F17C 1/06 220/591 |
| 2009/0314785 A1 | * | 12/2009 | Cronin | ................. B29C 53/602 156/305 |
| 2013/0313266 A1 | * | 11/2013 | Andernach | ............. B65B 53/02 264/513 |
| 2021/0222830 A1 | | 7/2021 | Katano | |
| 2021/0293380 A1 | * | 9/2021 | Fujii | ........................ F17C 1/06 |

FOREIGN PATENT DOCUMENTS

| | | |
|---|---|---|
| JP | 2012149739 A | 8/2012 |
| JP | 2021113569 A | 8/2021 |

* cited by examiner

*Primary Examiner* — John K Fristoe, Jr.
*Assistant Examiner* — Laura E. Parker
(74) *Attorney, Agent, or Firm* — Hunton Andrews Kurth LLP

(57) ABSTRACT

A high-pressure tank includes a first reinforcing layer and a second reinforcing layer. The first reinforcing layer is a layer obtained by joining dome members to respective end portions of a cylinder member, the dome members being a pair, and an inner peripheral surface of the cylinder member is exposed to a storage space that stores gas. A first resin layer covers the cylinder member between the first reinforcing layer and the second reinforcing layer. The first resin layer is less permeable to the gas in a thickness direction than the first reinforcing layer.

6 Claims, 15 Drawing Sheets

HIGH-PRESSURE TANK AND METHOD FOR MANUFACTURING HIGH-PRESSURE TANK

CROSS-REFERENCE TO RELATED APPLICATION

This application claims priority to Japanese Patent Application No. 2021-010390 filed on Jan. 26, 2021, incorporated herein by reference in its entirety.

BACKGROUND

1. Technical Field

The disclosure relates to a high-pressure tank and method for manufacturing a high-pressure tank.

2. Description of Related Art

For example, a high-pressure tank storing fuel gas is used in natural gas vehicles, fuel cell vehicles, etc. This type of high-pressure tank has a reinforcing layer made of a fiber reinforced resin and a storage space that stores gas.

For example, Japanese Unexamined Patent Application Publication No. 2012-149739 (JP 2012-149739 A) proposes, as such a high-pressure tank, a high-pressure tank having a first reinforcing layer made of a fiber reinforced resin and formed on the outer surface of a liner and a second reinforcing layer made of a fiber reinforced resin and covering the first reinforcing layer. In the high-pressure tank described in JP 2012-149739 A, the liner having gas barrier properties forms a storage space that stores gas.

SUMMARY

For high-pressure tanks, a pressure resistance test is conducted before shipping by filling the storage space of the high-pressure tank with water. However, the water is sometimes not sufficiently removed from the storage space after the test, and the water that has not been removed may remain in the storage space. Moreover, when a high-pressure tank is in use, water sometimes condenses in the storage space due to changes in temperature. Such water tends to collect on the inner surface of the cylinder portion (body portion) of the high-pressure tank due to the attitude of the high-pressure tank during use.

However, in the high-pressure tank described in JP 2012-149739 A, however, since the liner (resin layer) that reduces passage of gas is formed on the body portion, the liner on the body portion will directly contact the water. Depending on the material of the liner (resin layer), the liner may be deteriorated by the water.

Aspects of the present disclosure provide a high-pressure tank that suppresses a resin layer that reduces passage of gas from being deteriorated by contact with water and a method for manufacturing such a high-pressure tank.

A first aspect of the present disclosure relates to a high-pressure tank including: a first reinforcing layer made of a first fiber reinforced resin; and a second reinforcing layer made of a second fiber reinforced resin and covering the first reinforcing layer, the high-pressure tank having a storage space that stores gas. The first reinforcing layer is a layer provided with a cylinder member and a pair of dome members, the dome members being joined to respective end portions of the cylinder member, and an inner peripheral surface of the cylinder member is exposed to the storage space. The second reinforcing layer is a layer made of a fiber bundle impregnated with a resin, the fiber bundle being helically wound over the dome members of the first reinforcing layer. The high-pressure tank further includes a resin layer covering the cylinder member between the first reinforcing layer and the second reinforcing layer. The resin layer is less permeable to the gas in a thickness direction than the first reinforcing layer.

According to the aspect of the present disclosure, the resin layer covering the cylinder member is less permeable to the gas (i.e., has higher gas barrier properties) in the thickness direction than the first reinforcing layer. This configuration reduces leakage of the gas passing through the cylinder member of the first reinforcing layer to the outside through the second reinforcing layer. Moreover, the resin layer does not form the storage space. Accordingly, even if there is water in the storage space, this water will not directly contact the resin layer. This configuration reduces deterioration of the resin layer by contact with water.

The dome members may be fitted on the cylinder member from an outer side of the cylinder member. In each of fitting portions in which the dome members are fitted on the cylinder member, a part of the resin layer may be located between the cylinder member and the dome member.

The gas in the storage space is more likely to leak through the fitting portions in which the dome members are fitted on the cylinder member. According to this configuration, however, a part of the resin layer is formed between the cylinder member and the dome member in the fitting portions. This configuration thus reduces gas leakage from between the cylinder member and the dome members.

This specification discloses a method for manufacturing the above high-pressure tank. A second aspect of the present disclosure relates to a method for manufacturing a high-pressure tank including a first reinforcing layer made of a first fiber reinforced resin and a second reinforcing layer made of a second fiber reinforced resin and covering the first reinforcing layer, the high-pressure tank having a storage space that stores gas. The method includes: preparing a joined member that serves as the first reinforcing layer by joining a pair of dome members to a cylinder member having two end portions such that one of the dome members is joined to one of the two end portions of the cylinder member and the other one of the dome members is joined to the other one of the two end portions of the cylinder member; and forming the second reinforcing layer by helically winding a fiber bundle impregnated with a resin around the prepared joined member over the dome members. In the preparing of the joined member, the joined member in which a resin layer covers the cylinder member and in which an inner peripheral surface of the cylinder member is exposed to the storage space is prepared, and the resin layer is less permeable to the gas in a thickness direction than the first reinforcing layer.

According to the above aspect of the present disclosure, the resin layer covering the cylinder member is less permeable to the gas in the thickness direction than the first reinforcing layer. It is therefore possible to manufacture a high-pressure tank that reduces leakage of the gas passing through the cylinder member of the first reinforcing layer to the outside through the second reinforcing layer. Accordingly, it is not necessary to form a liner having high gas barrier properties on the inner peripheral surface of the cylinder member. Moreover, the resin layer does not form the storage space. Accordingly, even if there is water in the storage space, this water will not directly contact the resin layer. Since this configuration reduces deterioration of the resin layer by contact with water, resins etc. that are easily deteriorated by water can also be used for the resin layer. The number of choices of the material for the resin layer is therefore increased.

In the preparing of the joined member, a part of the resin layer may be formed between the cylinder member and the dome member in each of fitting portions in which the dome members are fitted on the cylinder member, the fitting portions being formed by fitting the dome members on the cylinder member of which outer peripheral surface is covered with the resin layer, from an outer side of the cylinder member.

According to this method, the high-pressure tank in which a part of the resin layer is formed between the cylinder member and each dome member can be obtained. This high-pressure tank thus reduces gas leakage from between the cylinder member and each dome member.

According to the high-pressure tank and the method for manufacturing a high-pressure tank according to the above aspects of the present disclosure, it is possible to suppress the resin layer that reduces passage of the gas from being deteriorated by contact with water.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment according to the present disclosure and a modification thereof will be described with reference to FIGS. 1 to 15.

1. High-Pressure Tank 1

A high-pressure tank 1 is herein described as a tank that is mounted on a fuel cell vehicle and that is filled with high-pressure hydrogen gas. However, the high-pressure tank 1 can also be applied to other uses. The gas that can be used for the high-pressure tank 1 is not limited to high-pressure hydrogen gas. Examples of the gas that can be used for the high-pressure tank 1 include various compressed gases such as compressed natural gas (CNG), various liquefied gases such as liquefied natural gas (LNG) and liquefied petroleum gas (LPG), and other gases.

Figure 1:
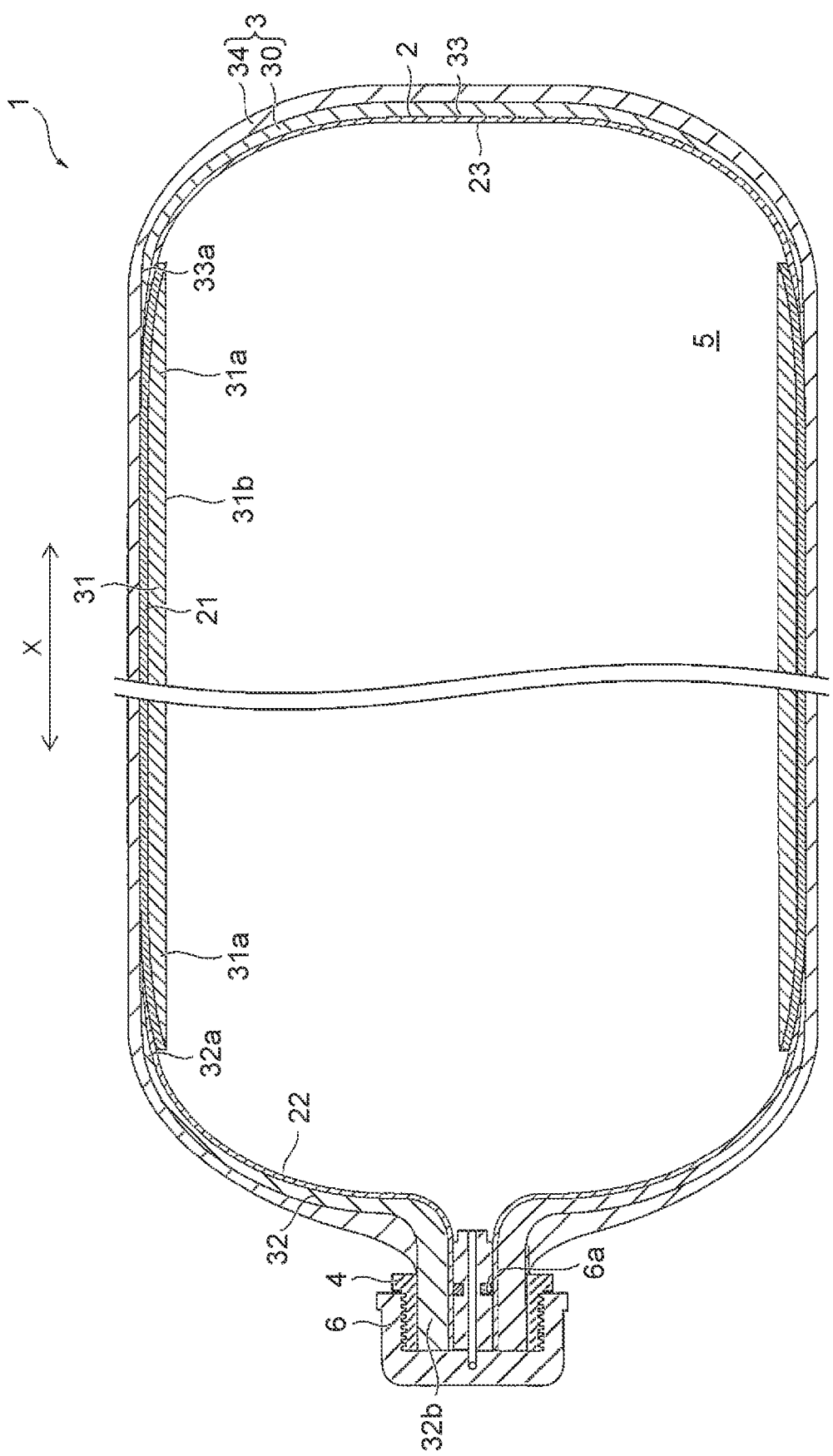
FIG. 1 is a schematic sectional view showing a structure of a high-pressure tank according to an embodiment of the present disclosure.

As shown in FIG. 1, the high-pressure tank 1 is a generally cylindrical high-pressure gas storage container with dome-shaped rounded ends. The high-pressure tank 1 includes a gas barrier portion 2 having gas barrier properties and a reinforcing portion 3 made of a fiber reinforced resin. The gas barrier portion 2 has a first resin layer 21 and second resin layers 22, 23. The reinforcing portion 3 has a first reinforcing layer 30 and a second reinforcing layer 34. The high-pressure tank 1 has an opening in its one end and has a boss 4 attached around the opening. The high-pressure tank 1 also has a storage space 5 that stores gas. The high-pressure tank 1 is mounted horizontally for use such that the axis (of a cylinder member 31 that will be described below) of the high-pressure tank 1 extends in the horizontal direction.

The boss 4 is formed by machining a metal material such as aluminum or aluminum alloy into a predetermined shape. A valve 6 that controls the flow of hydrogen gas into and out of the storage space 5 is attached to the boss 4. The valve 6 is provided with a seal member 6a. The seal member 6a is in contact with the gas barrier portion 2 in a protruding portion 32b of a dome member 32 that will be described later and seals the storage space 5 of the high-pressure tank 1.

The gas barrier portion 2 is a layer that reduces leakage of the gas stored in the storage space 5 to the outside. As described above, the gas barrier portion 2 has the first resin layer 21 and the second resin layers 22, 23. The first resin layer 21 of the present embodiment can be regarded as the "resin layer" according to the present disclosure. The first resin layer 21 and the second resin layers 22, 23 will be described later.

The reinforcing portion 3 functions to improve mechanical strength, such as rigidity and pressure resistance, of the high-pressure tank 1 and is made of a fiber reinforced resin, namely resin-impregnated reinforcing fibers (continuous fibers). The reinforcing portion 3 includes the first reinforcing layer 30 and the second reinforcing layer 34 covering the outer surface of the first reinforcing layer 30. The first reinforcing layer 30 has the cylindrical cylinder member 31 and a pair of dome members 32, 33. The dome members 32, 33 are joined to respective end portions 31a of the cylinder member 31. The first reinforcing layer 30 is formed as a single piece by joining the cylinder member 31 and the dome members 32, 33.

The first reinforcing layer 30 is composed of a plurality of fiber reinforced resin layers made of resin (matrix resin)-impregnated reinforcing fibers. The reinforcing fibers of the cylinder member 31 are oriented along the circumference of the cylinder member 31 at an angle substantially perpendicular to the axial direction X of the cylinder member 31. In other words, the reinforcing fibers in the cylinder member 31 are oriented in the circumferential direction of the cylinder member 31. The reinforcing fibers of the dome members 32, 33 are not oriented in the circumferential direction of the cylinder member 31 but extend from near the tops of the dome members 32, 33 toward peripheral end portions 32a, 33a of the dome members 32, 33 in various directions crossing the circumferential direction.

In the present embodiment, the reinforcing fibers of the cylinder member 31 and the reinforcing fibers of the dome members 32, 33 are not continuous (not connected). As will be described later, this is because the cylinder member 31 and the dome members 32, 33 are separately formed and the dome members 32, 33 are then attached to respective ends of the cylinder member 31.

Examples of the reinforcing fibers for the first reinforcing layer 30 (that is, the cylinder member 31 and the dome members 32, 33) include glass fibers, aramid fibers, boron fibers, and carbon fibers. Carbon fibers are particularly preferable in terms of lightness, mechanical strength, etc.

The matrix resin with which the reinforcing fibers for the first reinforcing layer 30 are impregnated is, but not particularly limited to, a thermoplastic resin or a thermosetting resin. Examples of the thermoplastic resin include polyetheretherketone, polyphenylene sulfide, polyacrylic ester, polyimide, polyamide, nylon 6, and nylon 6,6. Examples of the thermosetting resin include a phenol resin, a melamine resin, a urea resin, and an epoxy resin. An epoxy resin is particularly preferable in view of mechanical strength etc. Epoxy resins are fluid when uncured and form a strong crosslinked structure when thermally cured.

The second reinforcing layer 34 is composed of a plurality of fiber reinforced resin layers made of resin (matrix resin)-impregnated reinforcing fibers. In the present embodiment, the second reinforcing layer 34 covers the surface of the first resin layer 21 formed on the cylinder member 31 and the outer surfaces of the dome members 32, 33.

Specifically, the second reinforcing layer 34 is a layer made of a fiber reinforced resin with the reinforcing fibers oriented over the dome members 32, 33. The reinforcing fibers of the second reinforcing layer 34 are oriented so as to be tilted with respect to the axial direction X of the cylinder member 31 by helically winding a resin-impregnated fiber bundle. The dome members 32, 33 can be restrained to the cylinder member 31 by the reinforcing fibers. This can suppress the dome members 32, 33 from coming off from the cylinder member 31 outward in the axial direction X by the gas pressure when the high-pressure tank 1 is in use.

Examples of the reinforcing fibers for the second reinforcing layer 34 include materials similar to those mentioned above as examples of the reinforcing fibers for the first reinforcing layer 30, and examples of the matrix resin with which the reinforcing fibers for the second reinforcing layer 34 are impregnated include materials similar to those mentioned above as examples of the matrix resin for the first reinforcing layer 30.

In the present embodiment, the first resin layer 21 of the gas barrier portion 2 is formed between the first reinforcing layer 30 and the second reinforcing layer 34 so as to cover the cylinder member 31. For example, the first resin layer 21 is thinner than the first reinforcing layer 30. The thickness of the first resin layer 21 may be 0.05 mm to 5 mm, while the thickness of the first reinforcing layer 30 may be 10 mm or more. The first resin layer 21 has lower gas permeability (i.e., higher gas barrier properties) in the thickness direction than the first reinforcing layer 30.

This reduces leakage of the gas passing through the first reinforcing layer 30 to the outside through the second reinforcing layer 34. Especially, the amount of gas permeation increases as the surface area of the high-pressure tank 1 increases. In the present embodiment, since the surface area of the cylinder member 31 is larger than the overall surface area of the dome members 32, 33, a larger amount of gas passes through the cylinder member 31 than through the dome members 32, 33. Accordingly, the first resin layer 21 is formed on the cylinder member 31. This effectively reduces leakage of the gas passing through the first reinforcing layer 30 to the outside through the second reinforcing layer 34.

As used herein, the description "the first resin layer 21 has lower gas permeability in the thickness direction than the first reinforcing layer 30" means that the first resin layer 21 is less permeable to gas (has higher gas barrier properties) in the radial direction of the cylinder member 31 than the first reinforcing layer 30. The relationship of the gas permeability between the first resin layer 21 and the first reinforcing layer 30 can be verified by producing test pieces with the same thickness as the first resin layer 21 and test pieces with the same thickness as the first reinforcing layer 30 and measuring the amounts of gas (stored gas) that has passed through the test pieces. For example, a resin having lower gas permeability than the matrix resin with which the reinforcing fibers for the first reinforcing layer 30 are impregnated may be used for the first resin layer 21.

It is preferable that the first resin layer 21 have adhesiveness to the first reinforcing layer 30 and the second reinforcing layer 34. This can suppress separation between the first reinforcing layer 30 and the second reinforcing layer 34 when the high-pressure tank 1 is in use, and can thus maintain fatigue strength of the high-pressure tank 1.

For example, it is preferable that the resin of the first resin layer 21 and the fiber reinforced resin of the first reinforcing layer 30 are chemically bonded by a chemical reaction such as crosslinking reaction or polymerization reaction.

A resin material containing a synthetic resin with gas barrier properties as a base material and an elastomer that improves adhesiveness may be used as a material for the first resin layer 21. The synthetic resin with gas barrier properties is not particularly limited as long as it has higher gas barrier properties than the matrix resin. For example, the synthetic resin with gas barrier properties may be a thermoplastic resin. Examples of the thermoplastic resin include polyester resins and polyvinyl alcohol resins. In view of high gas barrier properties, polyethylene naphthalate (PEN) is preferable as a polyester resin, and ethylene-vinyl alcohol copolymer (EVOH) is preferable as a polyvinyl alcohol resin.

The elastomer is not particularly limited as long as it improves adhesiveness. For example, the elastomer may be rubber or modified rubber, namely rubber modified to have functional groups on its surface. Examples of the rubber include ethylene-butene copolymer (EBR), styrene-butadiene rubber (SBR), and nitrile rubber (NBR).

The functional groups of the modified rubber are not particularly limited as long as they are functional groups that improve adhesiveness to the first reinforcing layer 30 and the second reinforcing layer 34. For example, when the matrix resin for the first reinforcing layer 30 and the second reinforcing layer 34 is an epoxy resin, the functional groups of the modified rubber may be any functional groups that react with epoxy groups, and may be, for example, carboxyl groups, hydroxyl groups, or amino groups.

Examples of such a resin material include a resin material containing PEN and modified rubber having carboxyl groups or amino groups and a resin material containing EVOH and modified rubber having carboxyl groups or amino groups.

Alternatively, a sheet material or film material with a three-layer structure may be used as a material for the first resin layer 21. Specifically, a sheet material or film material composed of a barrier layer having gas barrier properties and adhesive layers having adhesiveness and formed on both surfaces of the barrier layer may be used as a material for the first resin layer 21. A resin for the barrier layer may be a resin similar to the synthetic resin with gas barrier properties described above. Examples of the resin for the barrier layer include EVOH and PEN. A resin for the adhesive layers may be, for example, a thermoplastic resin such as polypropylene (PP) resin or polyamide (PA) resin.

Example of such a sheet material or film material include sheet materials or film materials composed of a barrier layer made of EVOH and adhesive layers made of PP and formed on both surfaces of the barrier layer. Other examples include sheet or film materials composed of a barrier layer made of EVOH and adhesive layers made of PA and formed on both surfaces of the barrier layer.

Alternatively, an adhesive material composed of a urethane resin and a filler such as inorganic material may be used as a material for the first resin layer 21. The use of a urethane resin causes the first resin layer 21 to exhibit high elongation characteristics at low temperatures. The addition of the filler improves gas barrier properties of the first resin layer 21. Another adhesive material that can be used as a material for the first resin layer 21 is a modified epoxy resin as it has high gas barrier properties and has high elongation characteristics at low temperatures.

In the present embodiment, as shown in FIG. 1, the second resin layers 22, 23 are formed so as to cover inner surfaces 32f, 33f (see FIG. 6) of the dome members 32, 33, namely the surfaces of the dome members 32, 33 located on the inner side of the high-pressure tank 1, respectively. However, the second resin layers 22, 23 need not necessarily be formed in the manner shown in FIG. 1. The second resin layers 22, 23 may be formed between the first reinforcing layer 30 and the second reinforcing layer 34 so as to cover the dome members 32, 33, respectively.

The resin material, sheet or film material, or adhesive material mentioned above as examples of a material for the first resin layer 21 may be used as a material for the second resin layers 22, 23. The material for the first resin layer 21 and the material for the second resin layers 22, 23 may be either the same or different.

In the high-pressure tank 1 of the present embodiment, as shown in FIG. 1, an inner peripheral surface 31b of the cylinder member 31 is exposed to the storage space 5, and the storage space 5 is formed by the inner peripheral surface 31b of the cylinder member 31 and the second resin layers 22, 23. The first resin layer 21 does not form the storage space 5. Accordingly, even if water collects on the inner peripheral surface 31b of the cylinder member 31 of what is called the horizontal high-pressure tank 1, this water will not directly contact the first resin layer 21. This configuration reduces deterioration of the first resin layer 21 due to contact with water.

For example, resins having high gas barrier properties such as PEN and EVOH have polar groups in their molecules. These resins are easily hydrolyzed or easily swollen by water due to the polar groups, and therefore may have reduced gas barrier properties. In the present embodiment, however, as described above, the first resin layer 21 does not directly contact water. The first resin layer 21 therefore has high gas barrier properties.

Figure 2:
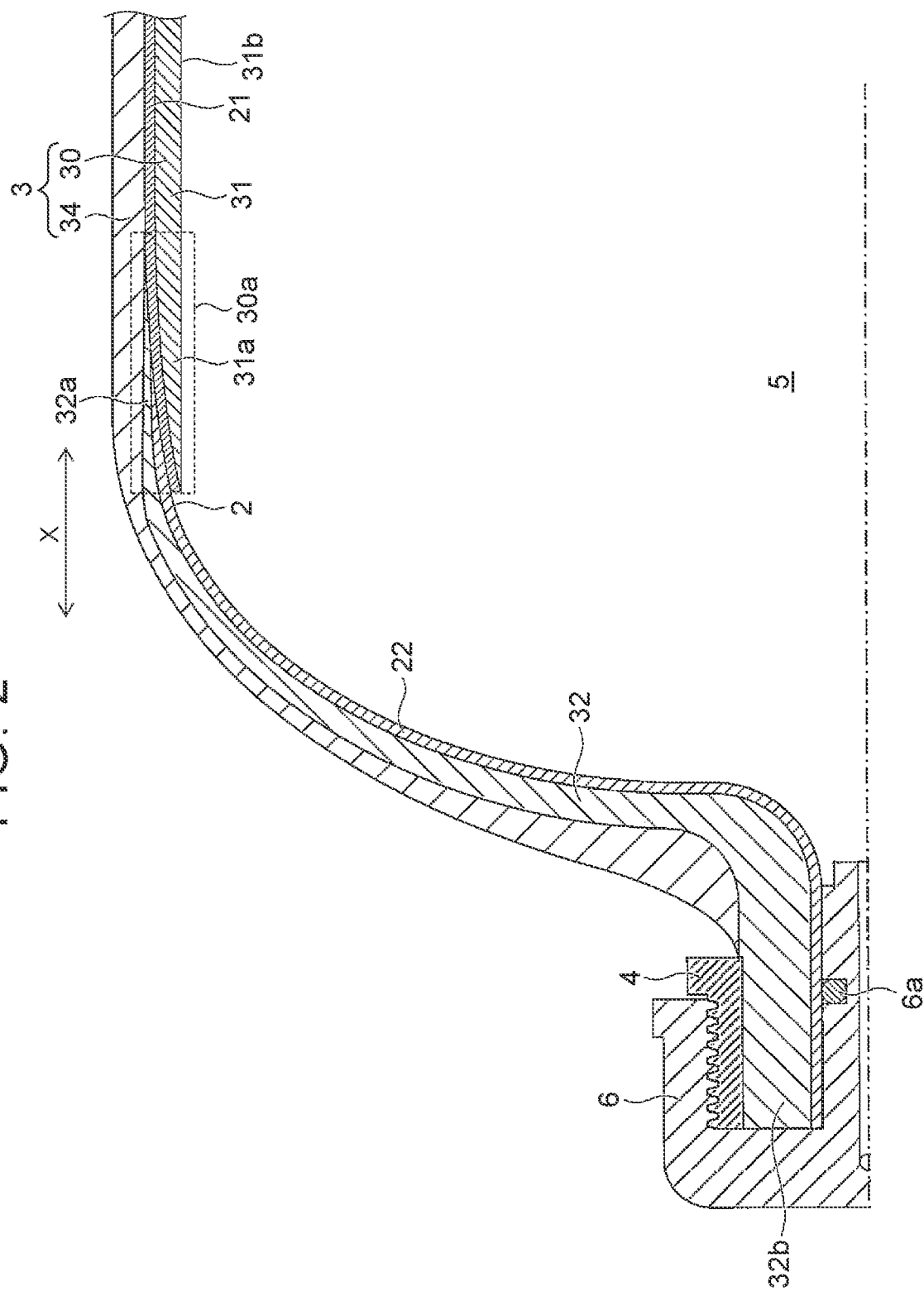
FIG. 2 is a partial sectional view showing the structure of the high-pressure tank shown in FIG. 1.

In the high-pressure tank 1 of the present embodiment, as shown in FIGS. 1 and 2, the dome members 32, 33 are fitted on the cylinder member 31 from the outer side of the cylinder member 31. Specifically, the peripheral end portions 32a, 33a of the dome members 32, 33 are fitted on the end portions 31a of the cylinder member 31 from the outer side of the cylinder member 31. An outer peripheral surface 31c (see FIG. 4) of the cylinder member 31 is covered with the first resin layer 21.

In each of fitting portions 30a in which the dome members 32, 33 are fitted on the cylinder member 31, a part of the first resin layer 21 is formed between the cylinder member 31 and each dome member 32, 33. Although the gas stored in the storage space 5 tends to leak through the fitting portions 30a in which the dome members 32, 33 are fitted on the cylinder member 31, this configuration reduces gas leakage from between the cylinder member 31 and each dome member 32, 33.

In the present embodiment, the inner surfaces 32f, 33f of the dome members 32, 33 are covered with the second resin layers 22, 23, respectively. In each of the fitting portions 30a, a part of the first resin layer 21 and a part of the second resin layer 22, 23 are formed between the cylinder member 31 and each dome member 32, 33, and the part of the first resin layer 21 and the part of the second resin layer 22, 23 are located on top of each other (joined together). This configuration effectively reduces gas leakage from between the cylinder member 31 and each dome member 32, 33.

2. Manufacturing Method of High-Pressure Tank 1

Figure 3:
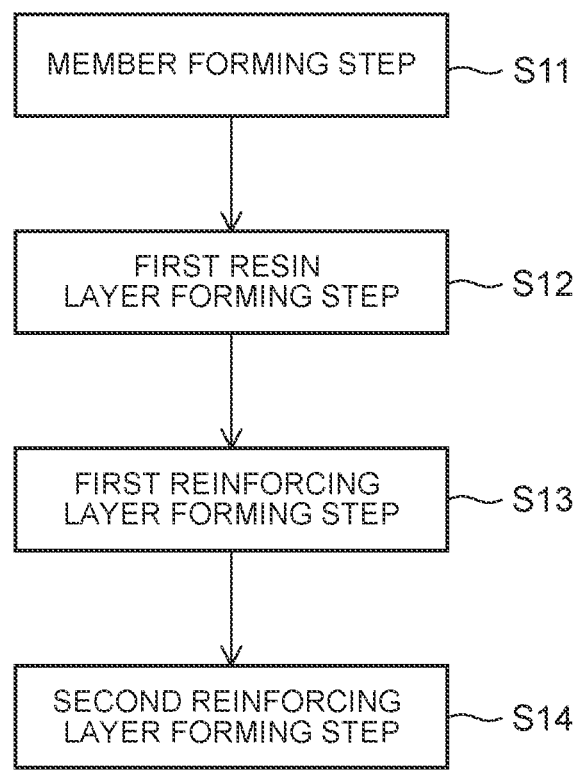
FIG. 3 is a flowchart illustrating steps of a method for manufacturing the high-pressure tank shown in FIG. 1.

Next, a method for manufacturing the high-pressure tank 1 according to the embodiment of the disclosure will be described. FIG. 3 is a flowchart illustrating steps of the method for manufacturing the high-pressure tank 1. As shown in FIG. 3, the method for manufacturing the high-pressure tank 1 includes a member forming step S11, a first resin layer forming step S12, a first reinforcing layer forming step S13, and a second reinforcing layer forming step S14. The member forming step S11, the first resin layer forming step S12, and the first reinforcing layer forming step S13 can be regarded as "preparing a joined member" in the present disclosure.

2-1. Member Forming Step S11

As shown in FIG. 3, the member forming step S11 is first performed in the method for manufacturing the high-pressure tank 1. In this step, the cylinder member 31 is formed and the dome members 32, 33 covered with the second resin layers 22, 23 are formed. This step may be omitted, and the cylinder member 31 and the dome members 32, 33 covered with the second resin layers 22, 23 may be prepared separately.

Method for Forming Cylinder Member 31

Figure 4:
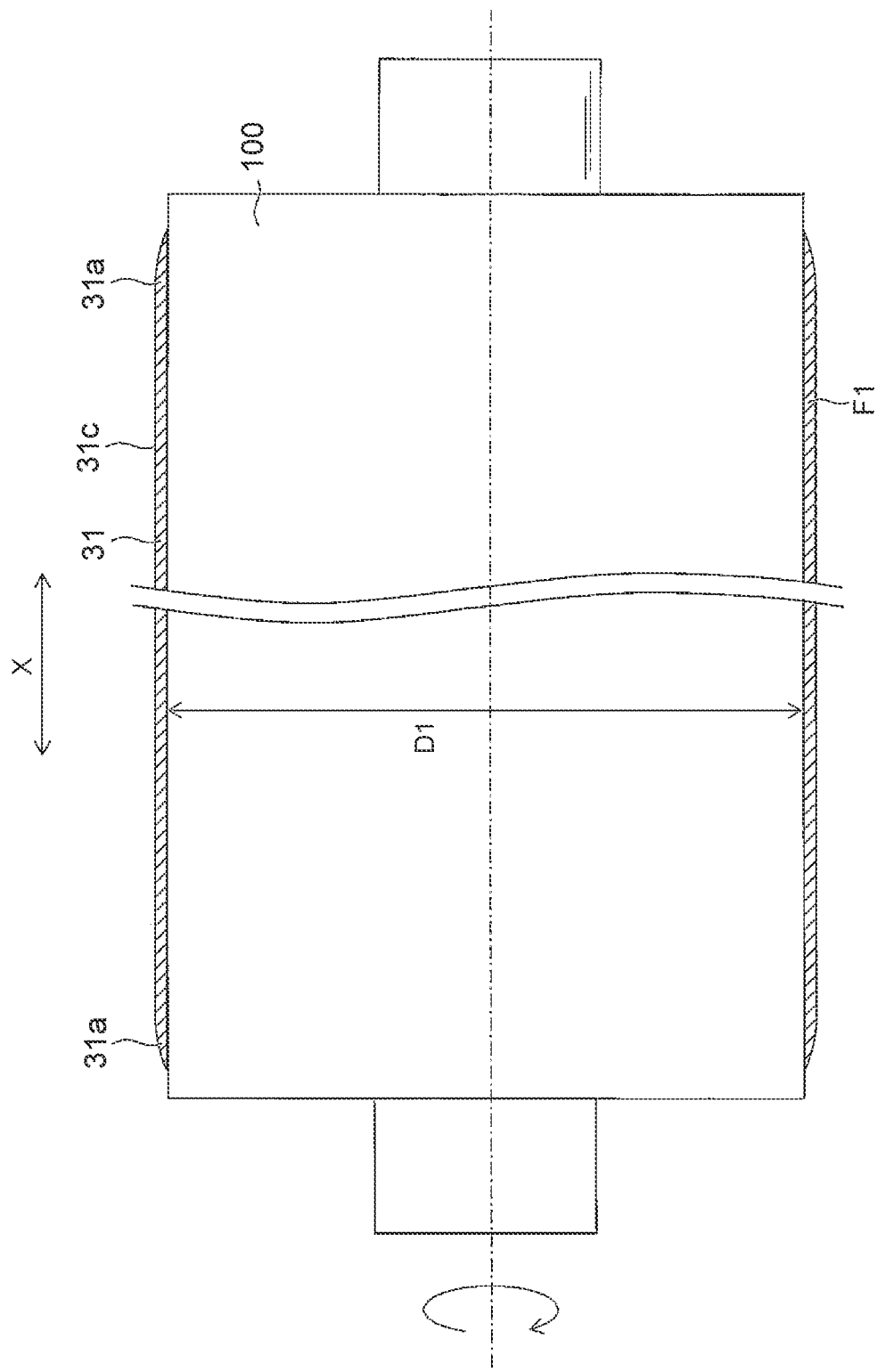
FIG. 4 is a sectional view illustrating a method for forming a cylinder member in a member forming step shown in FIG. 3.

In a method for forming the cylinder member 31, as shown in FIG. 4, the cylinder member 31 is formed by, for example, winding a fiber sheet F1 around a cylindrical mandrel 100. The outer diameter D1 of the mandrel 100 is an outer diameter corresponding to the inner diameter of the cylinder member 31, and is preferably set to such a value that the dome members 32, 33 can be fitted on the cylinder member 31 from the outer side of the cylinder member 31.

When forming the cylinder member 31, the fiber sheet F1 that is fed out is wound in a plurality of turns around the mandrel 100 while rotating the mandrel 100 in the circumferential direction of the mandrel 100 by a rotation mechanism (not shown). The fiber sheet F1 is a sheet made of reinforcing fibers aligned in one direction and impregnated with a matrix resin. The fiber sheet F1 is wound around the mandrel 100 such that the reinforcing fibers are oriented in the circumferential direction of the mandrel 100. The cylinder member 31 in which the reinforcing fibers are oriented in the circumferential direction is thus formed.

Materials similar to those mentioned above as examples of the reinforcing fibers for the first reinforcing layer 30 can be used as the reinforcing fibers for the fiber sheet F1, and materials similar to those mentioned above as examples of the matrix resin for the first reinforcing layer 30 can be used as the matrix resin with which the reinforcing fibers for the fiber sheet F1 are impregnated.

As shown in FIG. 4, the end portions 31a in the axial direction X of the cylinder member 31 become gradually thinner towards the ends in the axial direction X of the cylinder member 31. With such a shape, steps are less likely to be formed at the joint portions between the outer surface of the cylinder member 31 and the outer surfaces of the dome members 32, 33 when the peripheral end portions 32a, 33a of the dome members 32, 33 are placed on the end portions 31a of the cylinder member 31.

In order to make the ends portions 31a in the axial direction X of the cylinder member 31 gradually thinner toward the ends in the axial direction X of the cylinder member 31, the winding width of the fiber sheet F1 may be gradually reduced. Alternatively, the end portions 31a in the axial direction X of the cylinder member 31 may be made gradually thinner toward the ends in the axial direction X of the cylinder member 31 by pressing the both end portions 31a by a roller etc.

In the example described above, the cylinder member 31 is formed by winding the fiber sheet F1 around the mandrel 100. However, the cylinder member 31 may be formed by hoop-winding a matrix resin-impregnated fiber bundle around the mandrel 100 by filament winding (FW process). Alternatively, the cylinder member 31 may be formed by what is called centrifugal winding (CW process), namely by attaching a fiber sheet to the inner surface of the rotating mandrel 100.

When the matrix resin is a thermosetting resin, the fiber sheet F1 wound around the mandrel 100 is heated to cure the uncured thermosetting resin. On the other hand, when the matrix resin is a thermoplastic resin, the thermoplastic resin in a softened state is cooled to solidify the resin in the fiber sheet F1. After the resin is cured or solidified, the cylinder member 31 is removed from the mandrel 100. When a thermosetting resin is used, the matrix resin may be cured and chemically reacted (crosslinked or polymerized) with the resin of the first resin layer 21 after the first resin layer forming step S12 that will be described later. This increases adhesiveness between the cylinder member 31 and the first resin layer 21.

Method for Forming Dome Members 32, 33 with Second Resin Layers

Figure 5:
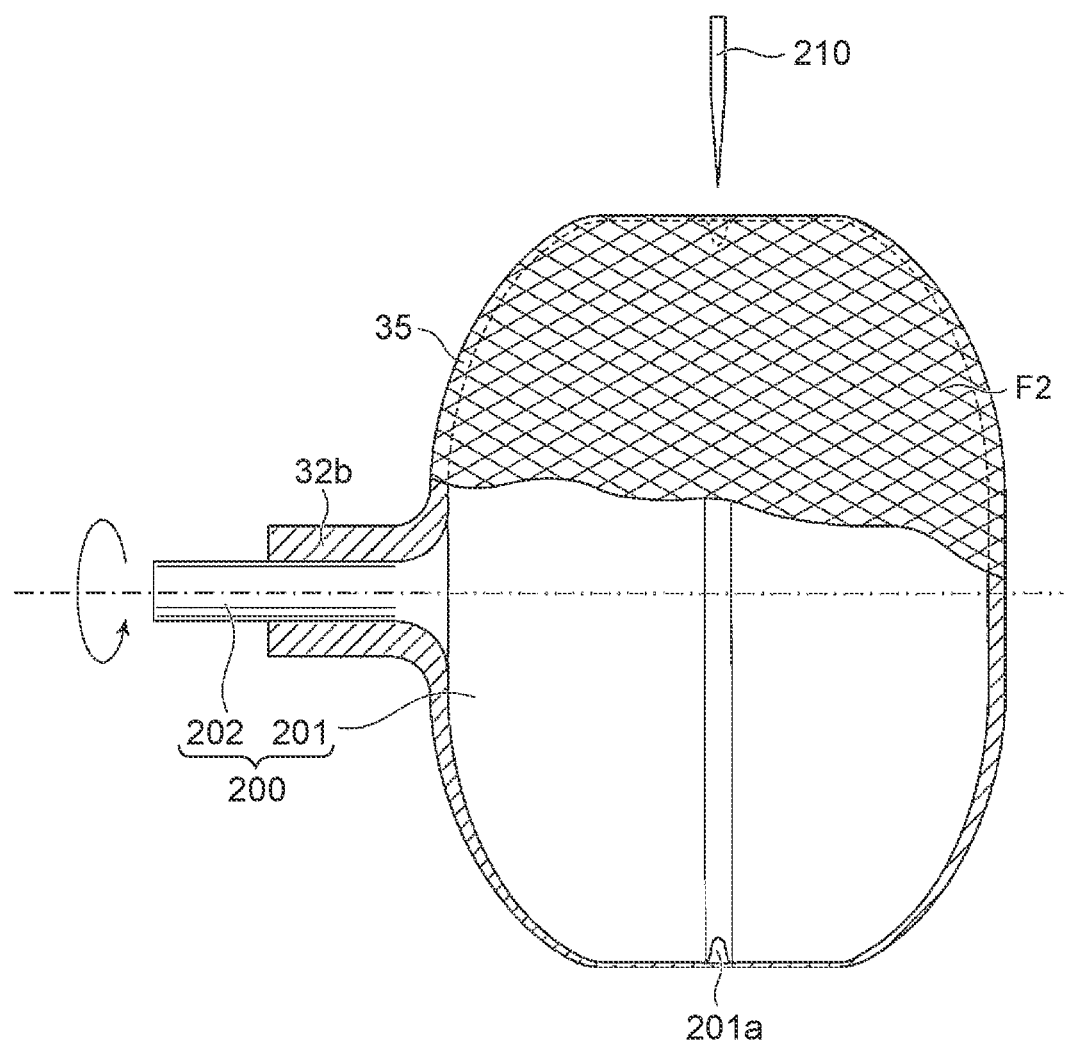
FIG. 5 is a partial sectional view illustrating a method for forming a pair of dome members in the member forming step shown in FIG. 3.
Figure 6:
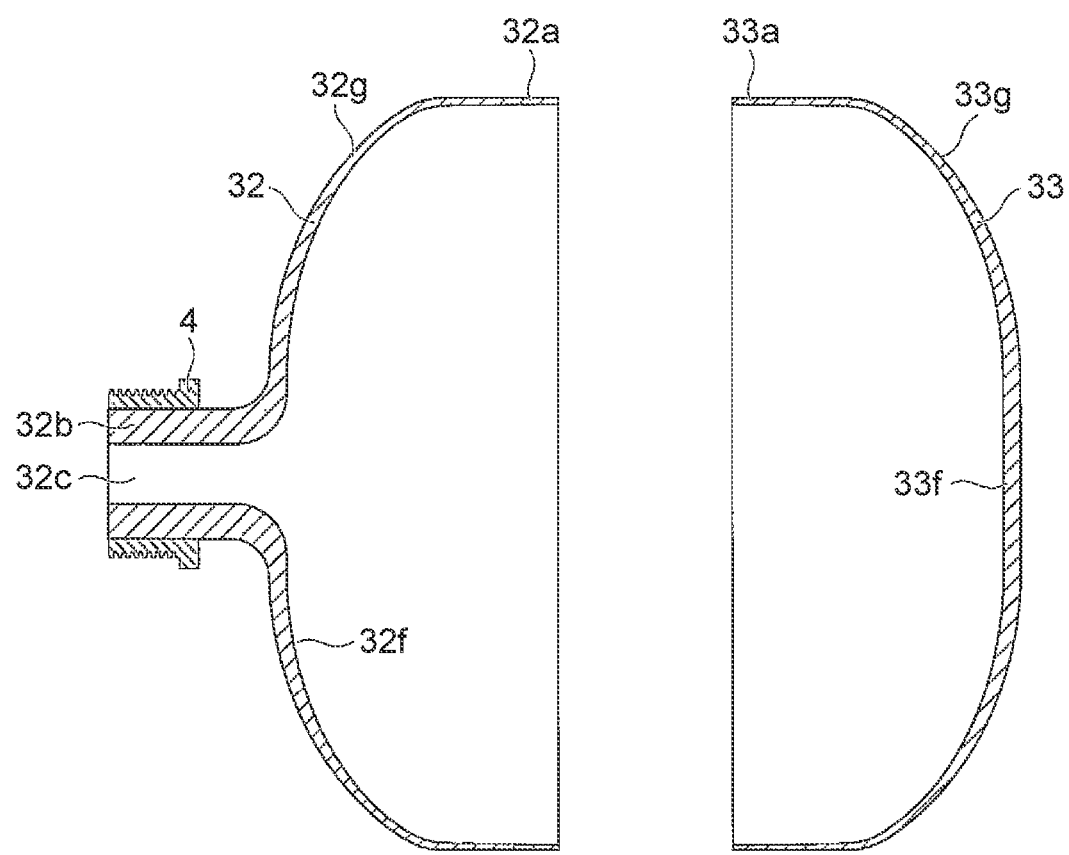
FIG. 6 is a sectional view of the dome members formed in the member forming step shown in FIG. 3.

In a method for forming the dome members 32, 33 covered with the second resin layers 22, 23, the dome members 32, 33 shown in FIG. 6 are first formed. In this method, as shown in FIG. 5, a fiber bundle F2 impregnated with a matrix resin is wound around a mandrel 200 by filament winding (FW process). Specifically, the mandrel 200 includes a body portion 201 and a shaft portion 202 extending outward from one end of the body portion 201.

The body portion 201 has a circular shape as viewed in the axial direction of the shaft portion 202. The body portion 201 has a groove 201a in the middle in the axial direction. The groove 201a is formed in the outer peripheral surface of the body portion 201 and extends along the entire circumference of the body portion 201. The mandrel 200 has a shape corresponding to the dome members 32, 33 joined together. The mandrel 200 has the groove 201a at a position corresponding to the joint between the dome members 32, 33. The shaft portion 202 is rotatably supported by a rotation mechanism (not shown).

When forming the dome members 32, 33, the mandrel 200 is first rotated to wind the fiber bundle F2 such that the fiber bundle F2 covers the outer surface of the mandrel 200, thereby forming a winding body 35. At this time, the fiber bundle F2 is also wound around the shaft portion 202 to form the cylindrical protruding portion 32b with a through hole 32c as shown in FIG. 6. The fiber bundle F2 is wound at an angle at, e.g., 30 to 50 degrees with respect to the axial direction of the shaft portion 202.

Materials similar to those mentioned above as examples of the reinforcing fibers for the first reinforcing layer 30 can be used as the reinforcing fibers for the fiber bundle F2, and materials similar to those mentioned above as examples of the matrix resin for the first reinforcing layer 30 can be used as the matrix resin with which the reinforcing fibers for the fiber bundle F2 are impregnated. When the matrix resin for the fiber bundle F2 is a thermoplastic resin, the fiber bundle F2 is wound around the mandrel 200 with the thermoplastic resin softened by heating. On the other hand, when the matrix resin for the fiber bundle F2 is a thermosetting resin, the fiber bundle F2 is wound around the mandrel 200 with the thermosetting resin uncured.

The winding body 35 may be pressed by a roller etc. near the position on the winding body 35 corresponding to the joint between the dome members 32, 33 such that the peripheral end portions 32a, 33a of the dome members 32, 33 become gradually thinner toward the ends in the axial direction X of the cylinder member 31.

Next, the winding body 35 formed on the outer surface of the mandrel 200 is divided into two parts using a cutter 210 (see FIG. 5). As shown in FIG. 6, the two parts of the winding body 35 are then removed from the mandrel 200. The dome members 32, 33 are formed in this manner.

Specifically, in the state shown in FIG. 5, the boss 4 is attached to the outer surface of the protruding portion 32b. When the resin with which the fiber bundle F2 of the winding body 35 is impregnated is a thermosetting resin, the winding body 35 is cured. When the resin with which the fiber bundle F2 of the winding body 35 is impregnated is a thermoplastic resin, the thermoplastic resin in a softened state is cooled to solidify the resin in the fiber bundle F2.

With the resin with which the fiber bundle F2 is impregnated being cured or solidified as described above, a blade of the cutter 210 is inserted into the groove 201a of the mandrel 200 while rotating the mandrel 200. The fiber bundle F2 is thus cut by the cutter 210. The winding body can be divided into two parts in this manner. The two parts thus obtained are then removed from the mandrel 200. The dome members 32, 33 are formed in this manner.

Figure 7:
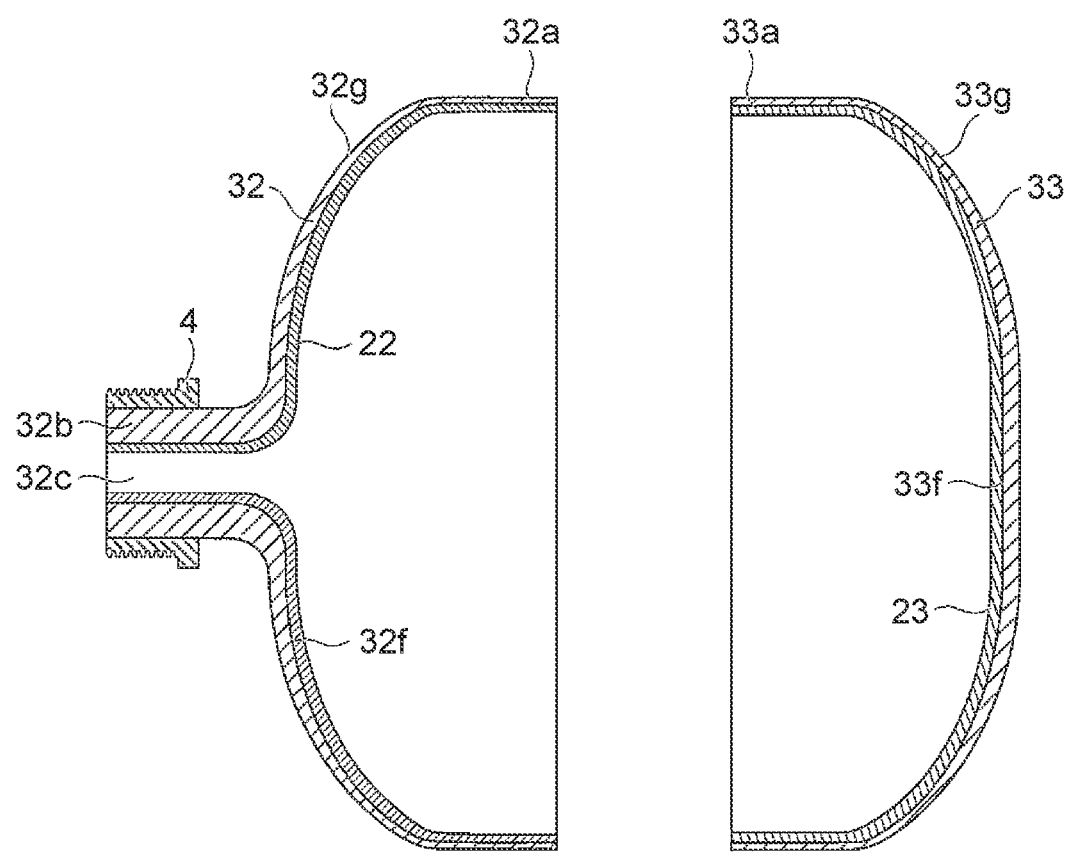
FIG. 7 is a sectional view of the dome members of FIG. 6 with a second resin layer formed thereon in the member forming step shown in FIG. 3.

Next, as shown in FIGS. 6 and 7, the second resin layers 22, 23 are formed on the inner surfaces 32f, 33f of the dome members 32, 33, respectively. Specifically, when the resin material or adhesive material mentioned as an example of the material for the first resin layer 21 is used, the second resin layers 22, 23 may be formed by liquifying or softening the resin material or adhesive material, applying the liquified or softened resin material or adhesive material to the inner surfaces 32f, 33f, and curing or solidifying the applied resin material or adhesive material. Alternatively, when the sheet or film material etc. mentioned as an example of the material for the first resin layer 21 is used, the second resin layers 22, 23 may be formed by bonding the sheet or film material to the inner surfaces 32f, 33f.

In the present embodiment, formation of the dome members 32, 33 and coating of the dome members 32, 33 with the second resin layers 22, 23 are performed separately. However, formation of the dome members 32, 33 and coating of the dome members 32, 33 with the second resin layers 22, 23 may be performed at the same time. In this case, for example, resin layers that will serve as the second resin layers 22, 23 may be formed on the surface of the mandrel 200 shown in FIG. 5, and the winding body 35 may be then formed on these resin layers. Thereafter, the winding body 35 may be cut into two parts. The dome members 32, 33 with the second resin layers 22, 23 may be formed in this manner.

In the example described above, the second resin layers 22, 23 are formed on the inner surfaces 32f, 33f of the dome members 32, 33, respectively. However, the present disclosure is not limited to this, and the second resin layers 22, 23 may be formed on outer surfaces 32g, 33g (see FIG. 6) of the dome members 32, 33, namely the surfaces of the dome members 32, 33 located on the outer side of the high-pressure tank 1, respectively. In this case, the inner surfaces 32f, 33f of the dome members 32, 33 may be exposed to the storage space 5.

2-2. First Resin Layer Forming Step S12

Figure 8:
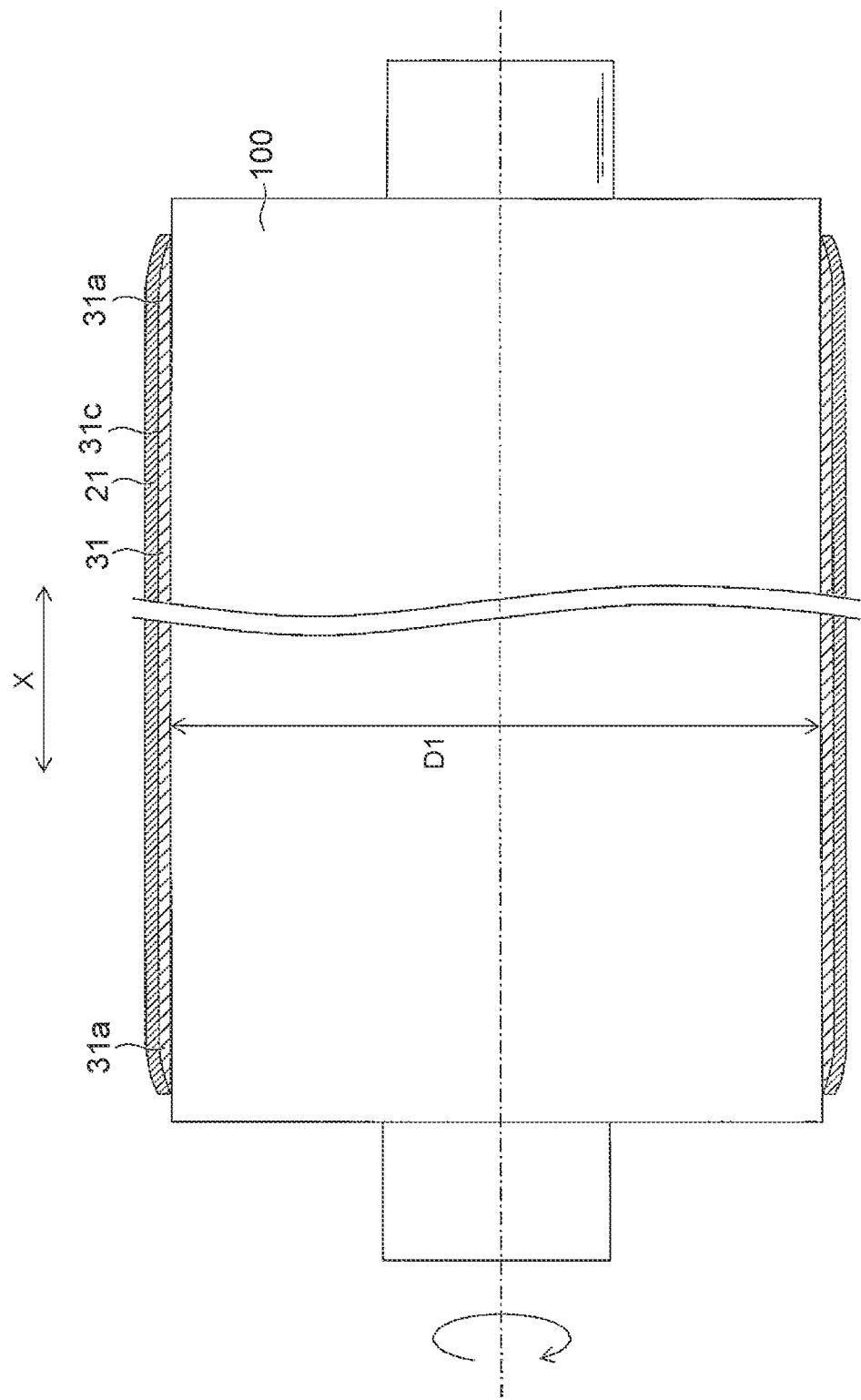
FIG. 8 is a sectional view illustrating a first resin layer forming step shown in FIG. 3.

Next, as shown in FIG. 3, the first resin layer forming step S12 is performed. In this step, as shown in FIGS. 4 and 8, the first resin layer 21 is formed so as to cover the outer peripheral surface 31c of the prepared cylinder member 31. The first resin layer 21 has lower gas permeability in the thickness direction than the first reinforcing layer 30. It is preferable that the first resin layer 21 have adhesiveness to the first reinforcing layer 30 and the second reinforcing layer 34.

When a resin material containing a synthetic resin with gas barrier properties as a base material and an elastomer that improves adhesiveness is used as a material for the first resin layer 21 as described above, the resin material may be liquified or softened and applied to the outer peripheral surface 31c of the cylinder member 31 to form the first resin layer 21.

When the first resin layer 21 (or the synthetic resin as a base material) is a thermoplastic resin and the matrix resin of the second reinforcing layer 34 is a thermosetting resin, it is preferable that the glass transition temperature (Tg) of the resin of the first resin layer 21 be lower than the curing temperature of the matrix resin of the second reinforcing layer 34.

As a result, when curing the matrix resin of the second reinforcing layer 34 that will be described later by heating, the thermoplastic resin of the first resin layer 21 is softened (melted). Therefore, the first resin layer 21 adheres to the second reinforcing layer 34. The first resin layer 21 and the matrix resin of the second reinforcing layer 34 may be chemically bonded by a chemical reaction such as cross-linking reaction or polymerization reaction. As a result, adhesiveness between the first reinforcing layer 30 and the second reinforcing layer 34 via the first resin layer 21 can be improved. For a thermoplastic resin, the glass transition temperature Tg can be set to a desired value by adjusting the average molecular weight of monomers, the degree of polymerization of the resin from monomers to polymers, and the like.

When the matrix resin of the second reinforcing layer 34 is an epoxy resin, it is preferable that the elastomer contained in the resin material described above be modified rubber, namely rubber modified to have, on its surface, functional groups that react with epoxy groups of the epoxy resin. For example, the functional groups may be carboxyl groups, hydroxyl groups, or amino groups. Accordingly, when curing the matrix resin of the second reinforcing layer 34 by heating, the epoxy resin of the second reinforcing layer 34 and the functional groups of the modified rubber are chemically bonded. As a result, adhesiveness between the first reinforcing layer 30 and the second reinforcing layer 34 can be improved.

As described above, a sheet material or film material composed of a barrier layer having gas barrier properties and adhesive layers having adhesiveness and formed on both surfaces of the barrier layer may be used as a material for the first resin layer 21. In this case, when forming the first resin layer 21, the sheet material or the film material may be wound in at least one turn around the cylinder member 31 and attached to the outer peripheral surface 31c of the cylinder member 31.

When the adhesive layer is a thermoplastic resin and the matrix resin of the second reinforcing layer 34 is a thermosetting resin, it is preferable that the thermoplastic resin be chemically bonded with the matrix resin under such a temperature condition that the matrix resin of the second reinforcing layer 34 is cured.

When the adhesive material mentioned above is used as a material that will become the first resin layer 21, the adhesive material may be applied to the outer peripheral surface 31c. When the resin material or adhesive material included in the material of the first resin layer 21 is a thermosetting resin, the resin is cured by heating. When a thermosetting resin is used, the thermosetting resin of the first resin layer 21 may be cured together with the matrix resin of the second reinforcing layer 34 in the second reinforcing layer forming step S14. As a result, adhesiveness between the first resin layer 21 and the second reinforcing layer 34 can be improved.

In the present embodiment, the first resin layer 21 is formed with the cylinder member 31 remaining on the mandrel 100. However, for example, the first resin layer 21 may be formed after removing the cylinder member 31 from the mandrel 100.

2-3. First Reinforcing Layer Forming Step S13

Figure 9:
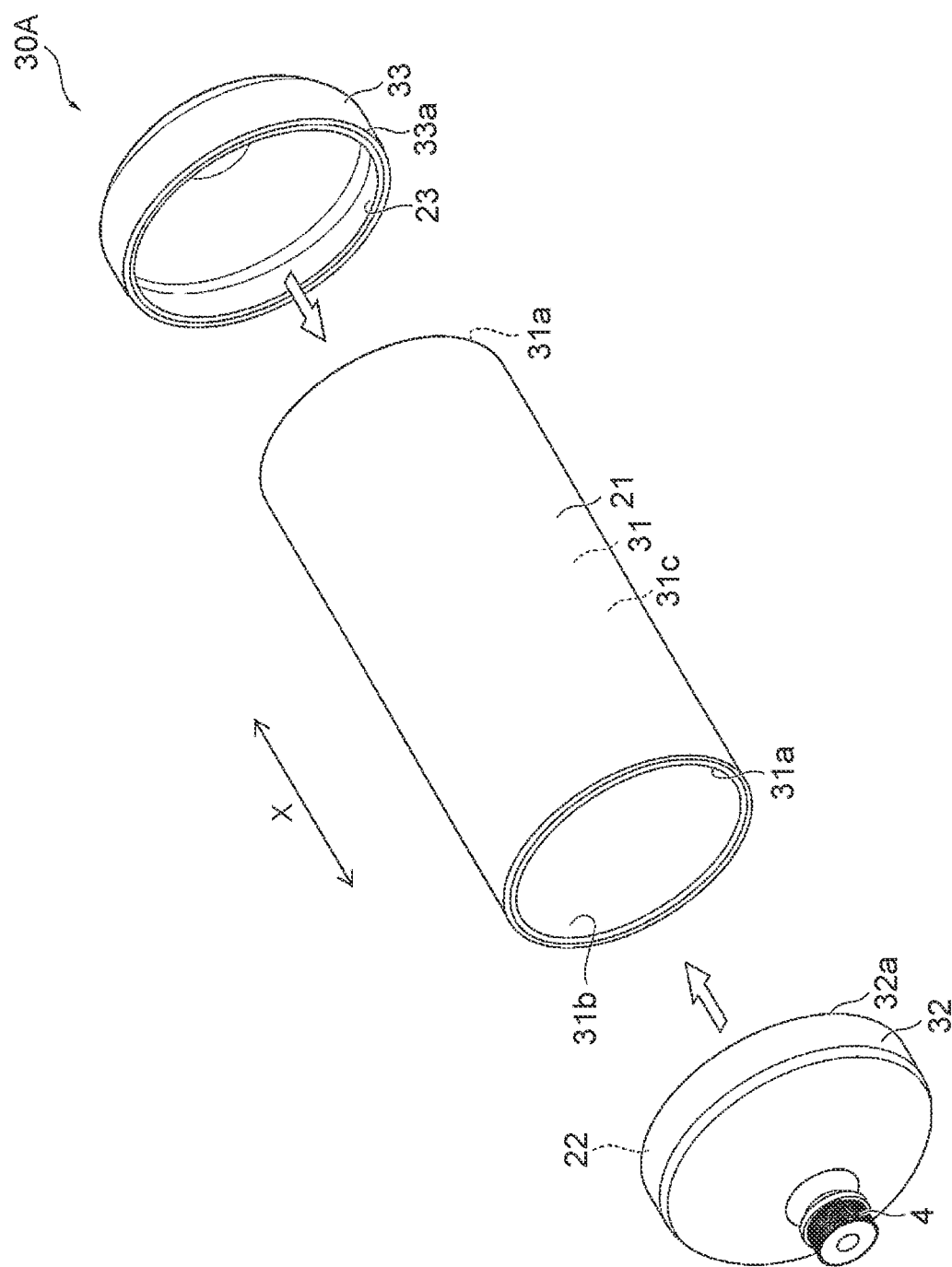
FIG. 9 is a schematic perspective view illustrating a first reinforcing layer forming step shown in FIG. 3.
Figure 10:
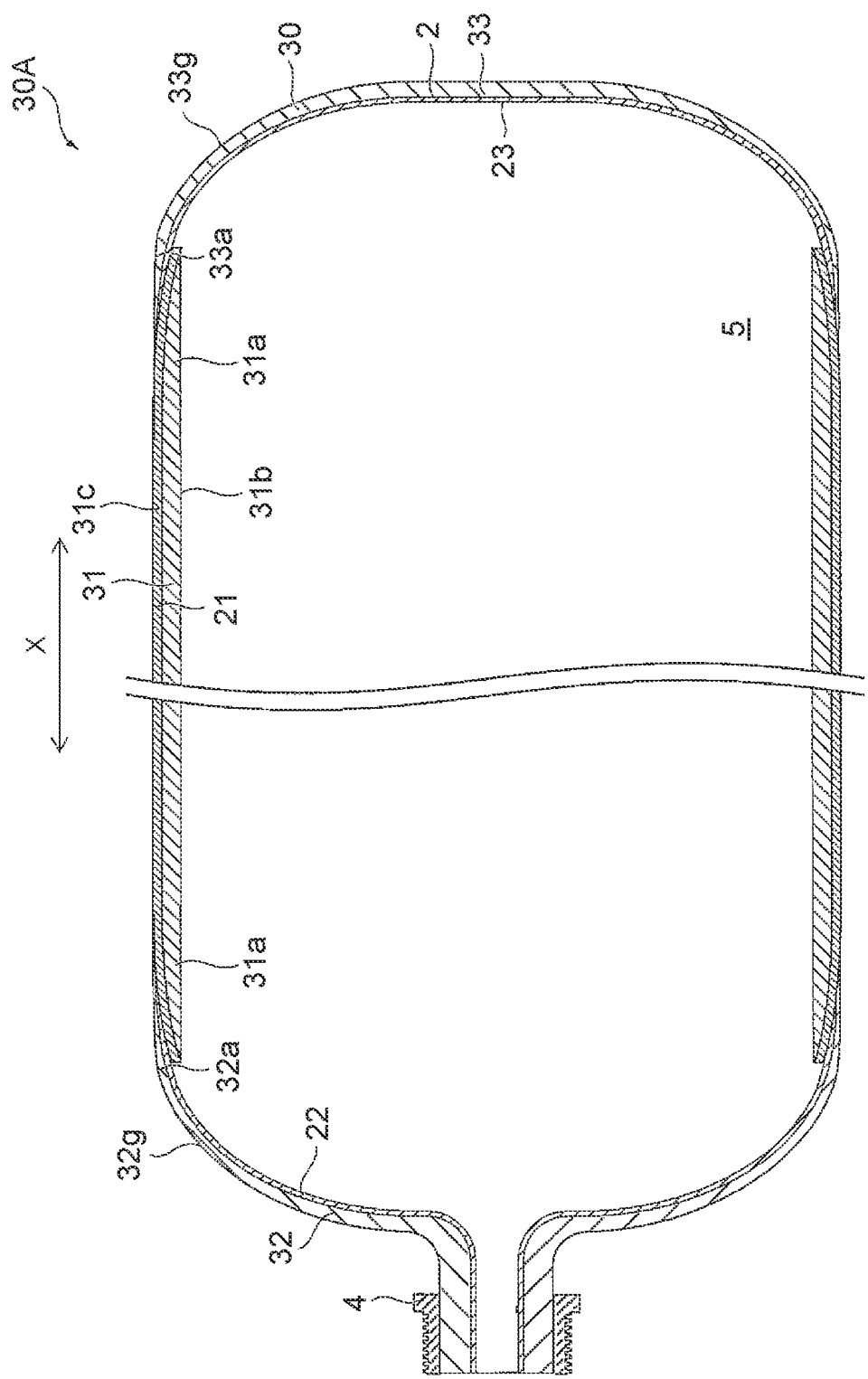
FIG. 10 is a sectional view of a joined member formed in the first reinforcing layer forming step shown in FIG. 3.

The first reinforcing layer forming step S13 is then performed as shown in FIG. 3. In this step, as shown in FIGS. 9 and 10, the dome members 32, 33 are joined to the end portions 31a of the cylinder member 31. Specifically, the peripheral end portions 32a, 33a of the dome members 32, 33 are joined to the end portions 31a of the cylinder member 31. A joined member 30A that will serve as the first reinforcing layer 30 can thus be formed.

In the present embodiment, the cylinder member 31 has the first resin layer 21 formed on its outer peripheral surface 31c, and the dome members 32, 33 have the second resin layers 22, 23 formed on their inner surfaces 32f, 33f. By joining such a cylinder member 31 and such dome members 32, 33, the joined member 30A having the first reinforcing layer 30 and the gas barrier portion 2 can be formed as shown in FIG. 10.

When joining the cylinder member 31 and the dome members 32, 33, the dome members 32, 33 are fitted on the cylinder member 31 from the outer side of the cylinder member 31 with its outer peripheral surface 31c covered with the first resin layer 21. Accordingly, in each of the fitting portions 30a (see FIG. 2) in which the dome members 32, 33 are fitted on the cylinder member 31, a part of the first resin layer 21 is formed between the cylinder member 31 and each dome member 32, 33. As a result, the high-pressure tank 1 in which a part of the first resin layer 21 is formed between the cylinder member 31 and each dome member 32, 33 can be obtained. This high-pressure tank 1 reduces gas leakage from between the cylinder member 31 and each dome member 32, 33.

In the present embodiment, in each of the fitting portions 30a, a part of the first resin layer 21 and a part of the second resin layer 22, 23 are formed between the cylinder member 31 and each dome member 32, 33. Therefore, when joining the cylinder member 31 and the dome members 32, 33, the part of the first resin layer 21 and the part of the second resin layer 22, 23 are joined together so as to be located on top of each other.

The cylinder member 31 and the dome members 32, 33 may be joined via the first and second resin layers 21 to 23 formed in the fitting portions 30a. When the resins forming the first and second resin layers 21 to 23 are thermoplastic resins, the fitting portions 30a may be heat-sealed (joined) by heating the fitting portions 30a and melting the thermoplastic resins. On the other hand, when the resins forming the first and second resin layers 21 to 23 are thermosetting resins, the fitting portions 30a may be joined by curing the fitting portions 30a by heating.

Alternatively, when the matrix resins forming the cylinder member 31 and the dome members 32, 33 are thermoplastic resins, the end portions 31a of the cylinder member 31 and the peripheral end portions 32a, 33a of the dome members 32, 33 may be heat-sealed (joined) by heating the end portions 31a of the cylinder member 31 and the peripheral end portions 32a, 33a of the dome members 32, 33 to melt the thermoplastic resins and fitting the peripheral end portions 32a, 33a of the dome members 32, 33 on the end portions 31a of the cylinder member 31. On the other hand, when the matrix resins forming the cylinder member 31 and the dome members 32, 33 are thermosetting resins, the cylinder member 31 and the dome members 32, 33 may be joined by fitting the dome members 32, 33 on the cylinder member 31 and curing the thermosetting resins by heating.

As shown in FIG. 10, in the joined member 30A thus prepared, the inner peripheral surface 31b of the cylinder member 31 is exposed to the storage space 5, and the storage space 5 is formed by the inner peripheral surface 31b of the cylinder member 31 and the second resin layers 22, 23. That is, the first resin layer 21 does not form the storage space 5.

In the joined member 30A, the outer peripheral surface 31c of the cylinder member 31 is covered with the first resin layer 21. Accordingly, when forming the second reinforcing layer 34 that will be described later, the first resin layer 21 can be formed between the first reinforcing layer 30 and the second reinforcing layer 34 so as to cover the cylinder member 31. As described above, such a first resin layer 21 has lower gas permeability in the thickness direction than the first reinforcing layer 30.

2-4. Second Reinforcing Layer Forming Step S14

Thereafter, the second reinforcing layer forming step S14 is performed as shown in FIG. 3. In this step, as shown in FIGS. 10 and 1, the second reinforcing layer 34 is formed by helically winding a fiber bundle impregnated with a resin (matrix resin) around the prepared joined member 30A over the dome members 32, 33.

Specifically, the fiber bundle impregnated with the matrix resin that will become the second reinforcing layer 34 is helically wound in layers around the surface of the joined member 30A by an FW process. In the present embodiment, in the joined member 30A, the outer peripheral surface 31c of the cylinder member 31 is covered with the first resin layer 21, as described above. Accordingly, the fiber bundle is wound around the surface of the first resin layer 21 and the outer surfaces 32g, 33g of the dome members 32, 33.

The helical winding is a winding method in which the fiber bundle is wound obliquely (in the range of 10° or more and 60° or less) over the dome members 32, 33 with respect to the axial direction X of the cylinder member 31. The number of layers of the wound fiber bundle is, for example, about 2 to 10. However, the number of layers of the wound fiber bundle is not particularly limited as long as the second reinforcing layer 34 is strong enough.

Materials similar to those mentioned above as examples of the reinforcing fibers for the first reinforcing layer 30 can be used as the reinforcing fibers for the fiber bundle, and materials similar to those mentioned above as examples of the matrix resin for the first reinforcing layer 30 can be used as the matrix resin with which the reinforcing fibers for the fiber bundle are impregnated.

When the matrix resin with which the fiber bundle is impregnated is a thermosetting resin, this resin is cured after the fiber bundle is wound around the joined member 30A. When the matrix resin of the first reinforcing layer 30 and the resins of the first and second resin layers 21 to 23 are thermosetting resins and have not been completely cured, these resins are also cured at this time. When the matrix resin with which the fiber bundle is impregnated is a thermoplastic resin, this resin is allowed to cool or forced to cool and solidified. When the matrix resin of the first reinforcing layer 30 and the resins of the first and second resin layers 21 to 23 are thermoplastic resins and have not completely solidified, these resins are also cooled and solidified.

By forming the second reinforcing layer 34 in this manner, the reinforcing portion 3 having the first reinforcing layer 30 and the second reinforcing layer 34 can be formed. In the reinforcing portion 3, the first resin layer 21 is formed between the first reinforcing layer 30 and the second reinforcing layer 34 so as to cover the cylinder member 31. Since adhesiveness between the first reinforcing layer 30 and the second reinforcing layer 34 can be improved via the first resin layer 21, voids are less likely to be formed between the first reinforcing layer 30 and the second reinforcing layer 34.

After the second reinforcing layer 34 is formed as described above, the high-pressure tank 1 is completed by attaching the valve 6 to the boss 4 as shown in FIG. 1.

According to the present embodiment, as described above, the first resin layer 21 covering the cylinder member 31 between the first reinforcing layer 30 and the second reinforcing layer 34 has lower gas permeability in the thickness direction than the first reinforcing layer 30. Accordingly, the high-pressure tank 1 that reduces leakage of the gas passing through the first reinforcing layer 30 to the outside through the second reinforcing layer 34 can be manufactured. It is therefore not necessary to form a liner having high gas barrier properties on the inner peripheral surface 31b of the cylinder member 31.

Moreover, the first resin layer 21 does not form the storage space 5 as described above. Accordingly, even if there is water in the storage space 5, the first resin layer 21 will not directly contact this water. Since this configuration reduces deterioration of the first resin layer 21 by contact with water, resins etc. that are easily deteriorated by water can also be used for the first resin layer 21. The number of choices of the material for the resin layer is therefore increased. For example, a resin having hydrophilic groups as functional groups (e.g., PEN, EVOH, or urethane) etc. can be suitably used.

3. Modification of Embodiment

A modification of the embodiment will be described with reference to FIGS. 11 to 15. The following description focuses on the differences from the above embodiment. The same members and portions as those in the above embodiment are denoted by the same signs and detailed description thereof will be omitted.

In the high-pressure tank 1 of the above embodiment, a part of the first resin layer 21 is formed between the cylinder member 31 and each dome member 32, 33 in each fitting portions 30a. However, the structure of the fitting portions 30a is not limited to this.

Figure 11:
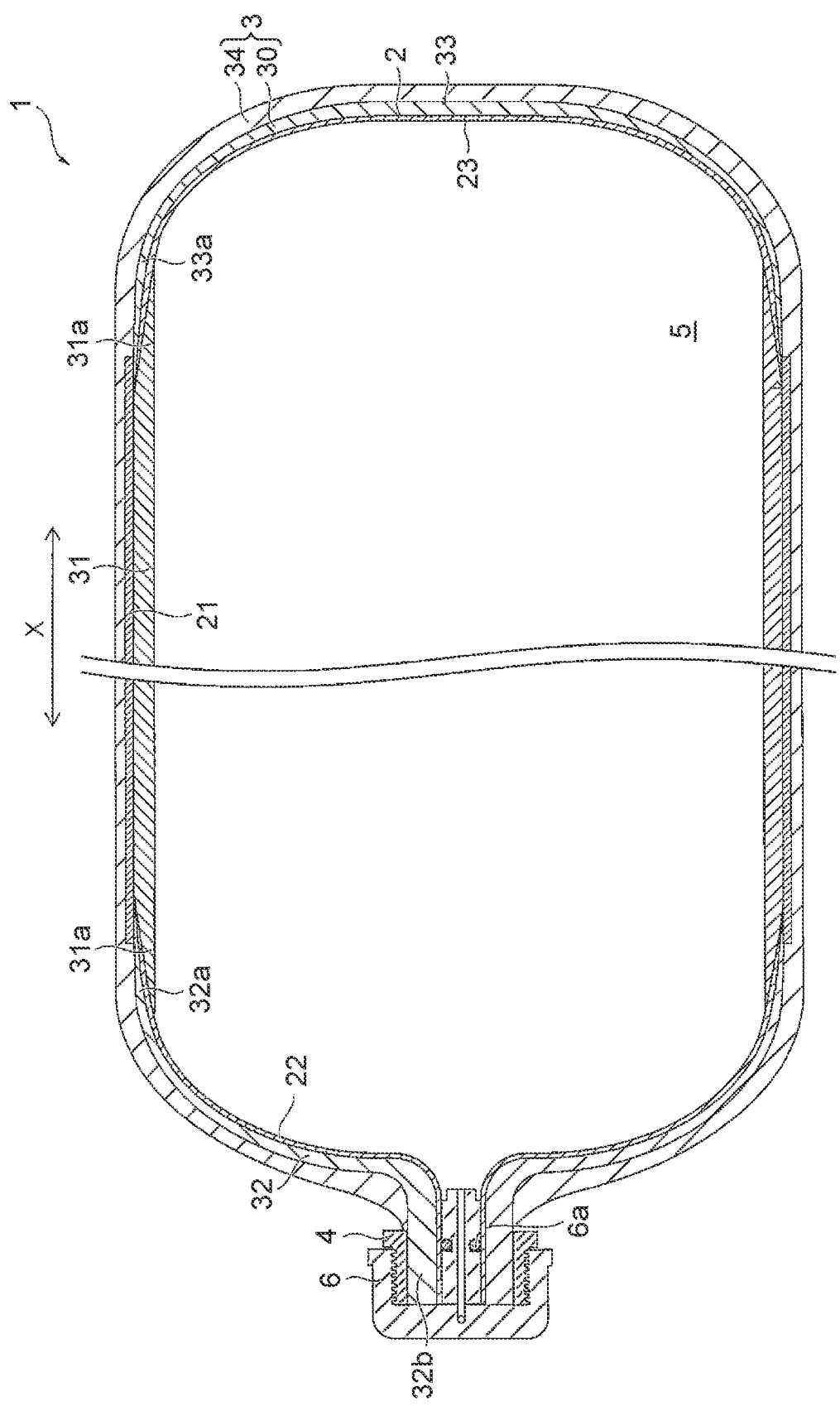
FIG. 11 is a sectional view showing the structure of a modification of the high-pressure tank shown in FIG. 1.
Figure 12:
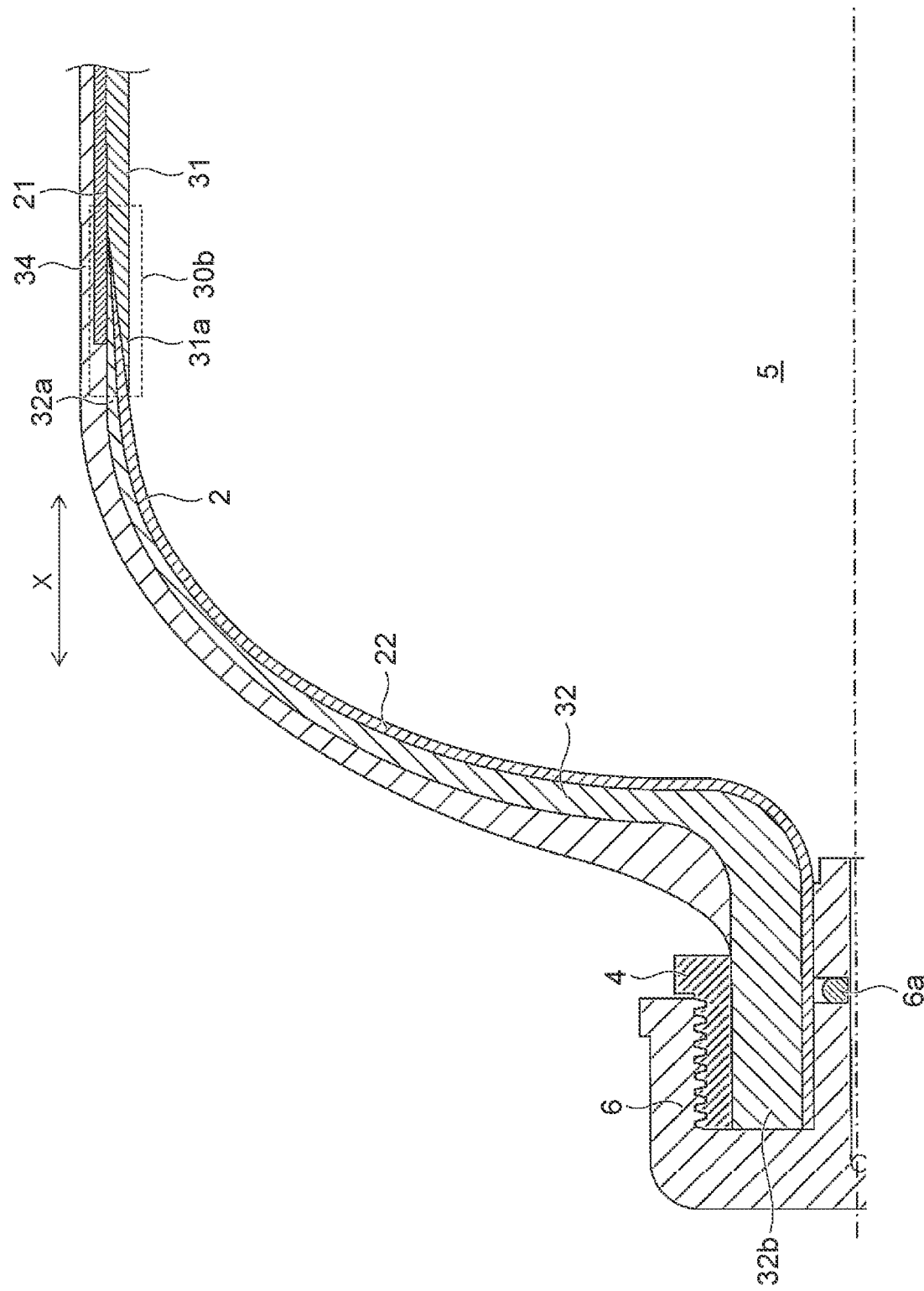
FIG. 12 is a partial sectional view showing the structure of the high-pressure tank shown in FIG. 11.

For example, as in the high-pressure tank 1 of the modification shown in FIGS. 11 and 12, the first resin layer 21 may be continuously formed so as to cover at least a part of each of the outer surfaces 32g, 33g of the dome members 32, 33 in fitting portions 30b. Specifically, the first resin layer 21 extends on the outer peripheral surface of a joined member 30B (see FIG. 15) of the cylinder member 31 and the dome members 32, 33 that will be described later so as to cover the boundary portions between the cylinder member 31 and the dome members 32, 33. This configuration reduces gas leakage from the boundary portions by the first resin layer 21.

Figure 13:
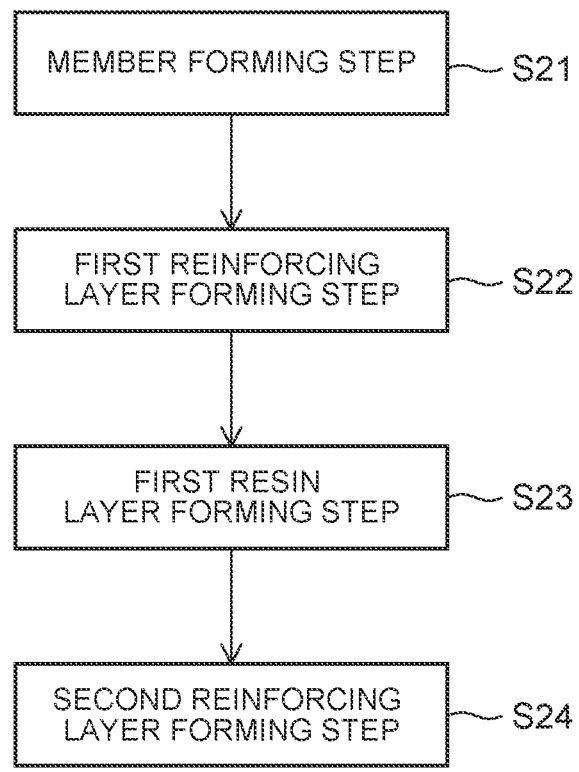
FIG. 13 is a flowchart illustrating steps of a method for manufacturing the high-pressure tank shown in FIG. 11.

As shown in FIG. 13, in a method for manufacturing the high-pressure tank 1 of the modification, the order of the first reinforcing layer forming step and the first resin layer forming step is different from that of the above embodiment. The following description focuses on the differences from the above embodiment. A member forming step S21, a first reinforcing layer forming step S22, and a first resin layer forming step S23 correspond to the "preparing a joined member" in the present disclosure.

Figure 14:
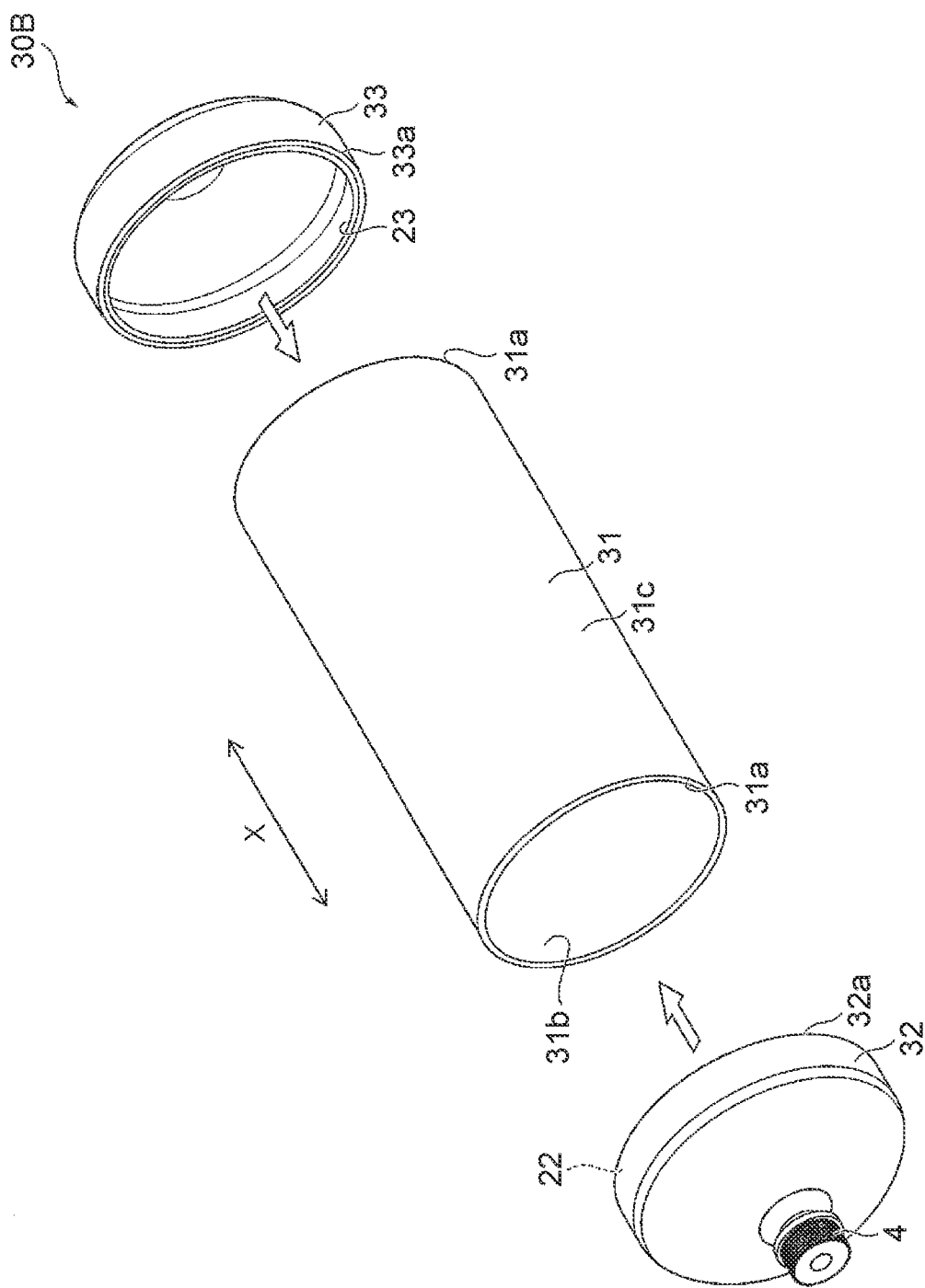
FIG. 14 is a schematic perspective view illustrating a first reinforcing layer forming step shown in FIG. 13.

In the method for manufacturing the high-pressure tank 1 of the modification, the member forming step S21 is similar to the member forming step S11 of the above embodiment. In the first reinforcing layer forming step S22, as shown in FIG. 14, the dome members 32, 33 are joined to the end portions 31a of the cylinder member 31 to form the joined member 30B before the first resin layer 21 is formed.

Figure 15:
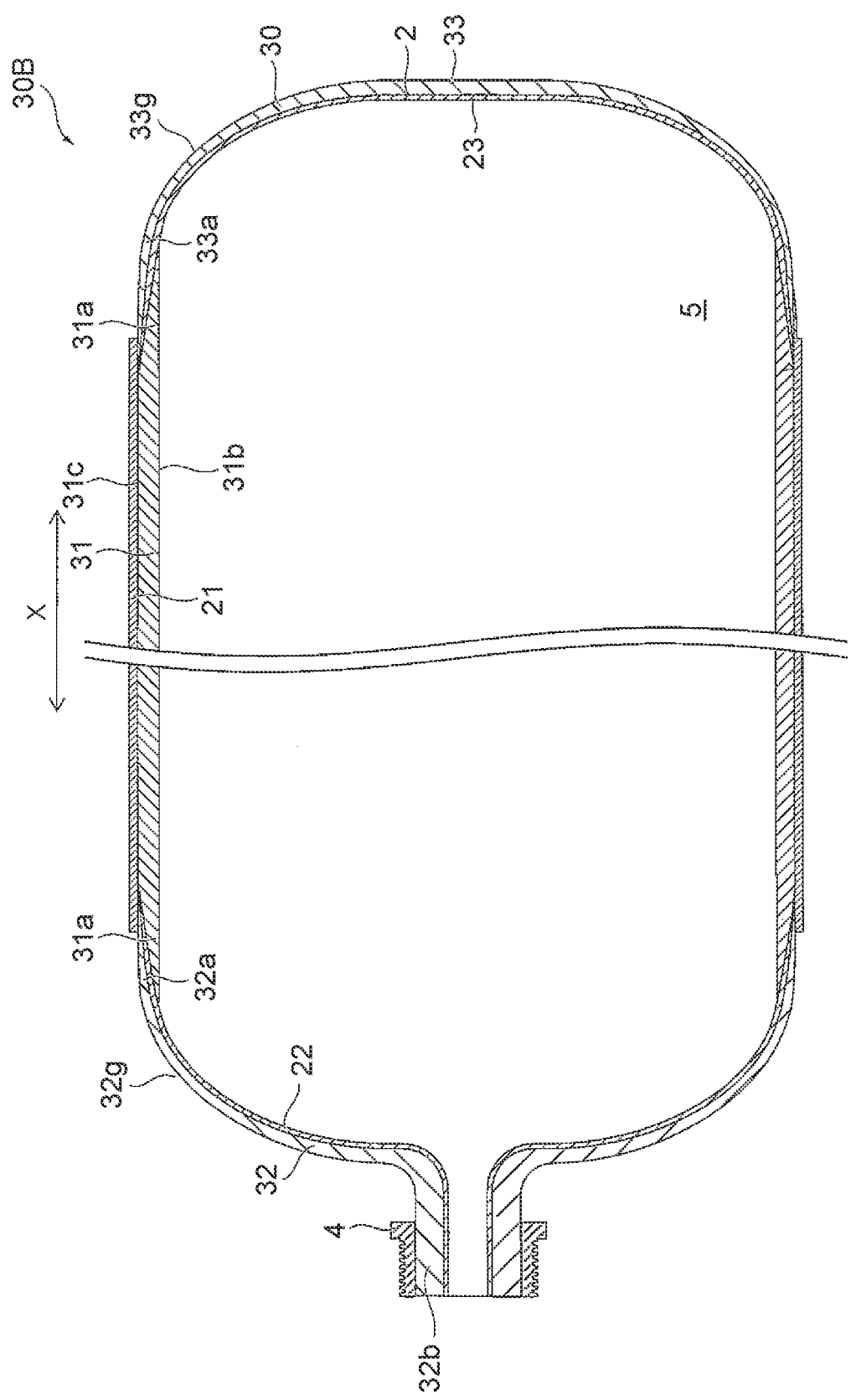
FIG. 15 is a sectional view of a joined member formed in the first reinforcing layer forming step shown in FIG. 13.

The first resin layer forming step S23 is then performed as shown in FIG. 13. In this step, as shown in FIG. 15, the first resin layer 21 is formed on the outer peripheral surface 31c of the cylinder member 31 in the form of the joined member 30B in a manner similar to that of the first resin layer forming step S12 of the above embodiment. Specifically, the first resin layer 21 is formed so as to cover the outer peripheral surface 31c of the cylinder member 31 and the outer peripheral surfaces of the peripheral end portions 32a, 33a of the dome members 32, 33.

Thereafter, the second resin layer forming step S24 is performed as shown in FIG. 13. In this step, as shown in FIGS. 15 and 11, the second reinforcing layer 34 is formed in a manner similar to that of the second reinforcing layer forming step S14 of the above embodiment. The high-pressure tank 1 according to the modification can be obtained in this manner.

Although the embodiment of the present disclosure is described in detail above, the present disclosure is not limited to the embodiment, and various design changes can be made.

What is claimed is:

1. A high-pressure tank, comprising:
a first reinforcing layer made of a first fiber reinforced resin; and
a second reinforcing layer made of a second fiber reinforced resin and covering the first reinforcing layer, the high-pressure tank having a storage space that stores gas, wherein:
the first reinforcing layer is a layer provided with a cylinder member and a pair of dome members, the dome members being joined to respective end portions of the cylinder member, and an inner peripheral surface of the cylinder member is exposed to the storage space;
the second reinforcing layer is a layer made of a fiber bundle impregnated with a resin, the fiber bundle being helically wound over the dome members of the first reinforcing layer;
the high-pressure tank further includes a resin layer covering the cylinder member between the first reinforcing layer and the second reinforcing layer;
the resin layer is less permeable to the gas in a thickness direction than the first reinforcing layer; and
the resin layer is exposed to the storage space.

2. The high-pressure tank according to claim 1, wherein:
the dome members are fitted on the cylinder member from an outer side of the cylinder member; and
in each of fitting portions in which the dome members are fitted on the cylinder member, a part of the resin layer is located between the cylinder member and the dome member.

3. A method for manufacturing a high-pressure tank including a first reinforcing layer made of a first fiber reinforced resin and a second reinforcing layer made of a second fiber reinforced resin and covering the first reinforcing layer, the high-pressure tank having a storage space that stores gas, the method comprising:
preparing a joined member that serves as the first reinforcing layer by joining a pair of dome members to a cylinder member having two end portions such that one of the dome members is joined to one of the two end portions of the cylinder member and the other one of the dome members is joined to the other one of the two end portions of the cylinder member;
forming the second reinforcing layer by helically winding a fiber bundle impregnated with a resin around the prepared joined member over the dome members, wherein:
the joined member in prepared to have a resin layer that covers the cylinder member and an inner peripheral surface of the cylinder member is prepared so as to be exposed to the storage space, and the resin layer is less permeable to the gas in a thickness direction than the first reinforcing layer; and
the resin layer is exposed to the storage space.

4. The method according to claim 3, wherein, in the preparing of the joined member, a fitting portion is formed at each end of the cylinder member when the dome members are fitted on an outer peripheral surface of the cylinder member, wherein a part of the resin layer is arranged between the cylinder member and the dome member in each of the fitting portions.

5. The high-pressure tank according to claim 1, wherein the resin layer is provided on the entirety of the dome members.

6. The method according to claim 3, wherein the resin layer is provided on the entirety of the dome members.

* * * * *